May 7, 1957 F. R. SWANSON 2,791,439
TRAILER FRAME
Filed Jan. 20, 1955
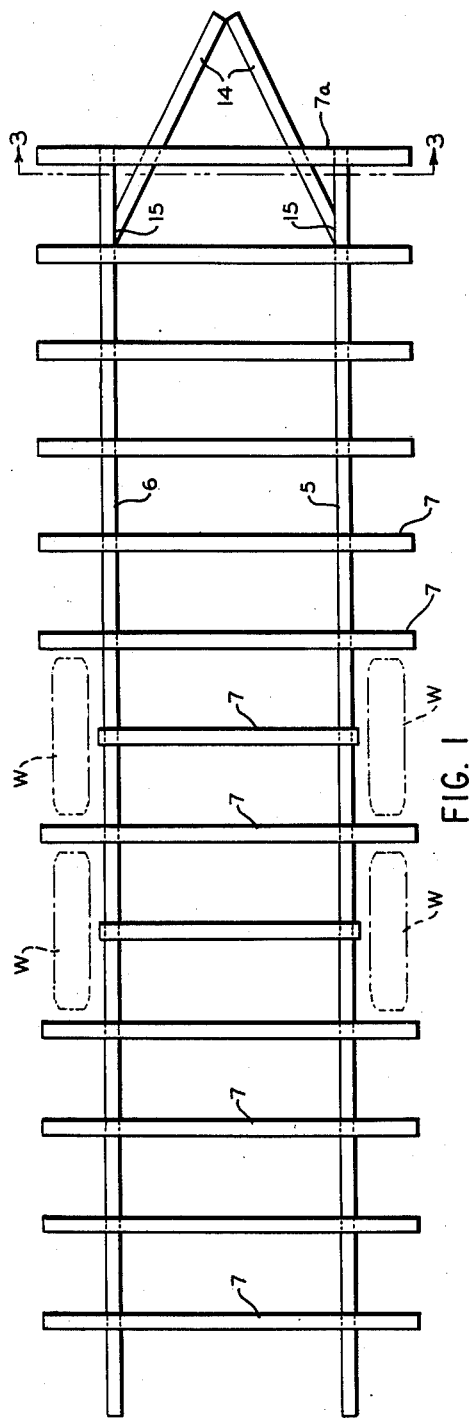
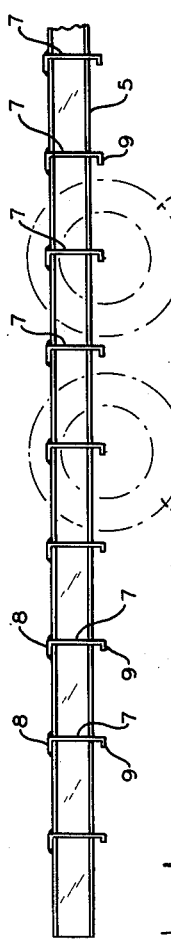
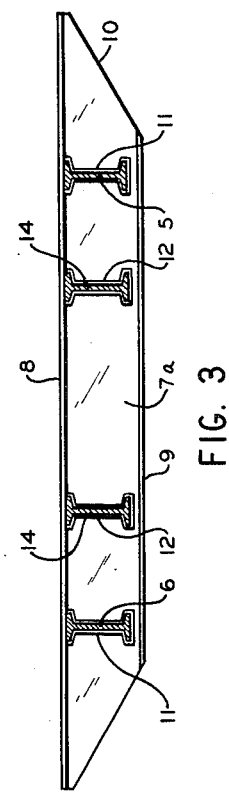
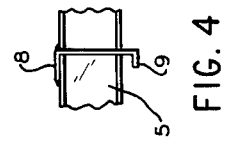
INVENTOR.
Frank R. Swanson.
BY
Harman & Harman
ATTORNEYS United States Patent Office 2,791,439
Patented May 7, 1957

2,791,439
TRAILER FRAME
Frank R. Swanson, Owosso, Mich.
Application January 20, 1955, Serial No. 482,913
3 Claims. (Cl. 280—106)

This invention relates to under frames for trailers and vehicles in general.

One of the prime objects of the invention is to design a vehicle frame made up of a plurality of members cut to length and size so that they can be readily threaded on the sill members in spaced relation and thence secured to form a unitary under frame for a vehicle body.

Another object of the invention is to design an under frame comprising main sill beams and transverse cross members, which in trailer frames particularly are of varying length, which can be mass-produced by punch and die methods so that the frames can be shipped in knockdown form in bundles and assembled by the user when required, thus effecting a substantial saving in shipping, storage space, and the added economical advantage of quantity purchase.

A further object is to provide a sectional knockdown vehicle frame in which the transverse cross members are shaped and stamped to permit them to be readily threaded on the sill members in spaced relation and then welded in position to form a rugged and substantial one-piece frame.

A further object still is to design a sectional, knockdown, lightweight frame formed of a plurality of lightweight sections shaped for rigidity and strength with rounded corners and ends to provide a neat-appearing, lightweight, substantial frame that can be very economically manufactured, shipped and assembled.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

Fig. 1 is a top plan view of an assembled trailer frame, the running gear being shown in broken lines.

Fig. 2 is a fragmentary, edge elevational view thereof.

Fig. 3 is an enlarged, transverse, sectional view taken on the line 3—3 of Fig. 1.

Fig. 4 is an enlarged, transverse, sectional detail showing the manner of connecting the cross members to the sill members.

Referring now more particularly to the drawing in which I have shown the preferred embodiment of my invention, the numerals 5 and 6 indicate the longitudinal sills of the frame and these are preferably, but not necessarily, in the form of pressed I-beams.

A plurality of cross members 7 span the sills 5 and 6 and are formed as clearly shown in Figs. 3 and 4 of the drawing, each cross member being formed with an upper turned flange 8 and a lower flange 9, the ends of each member being angled as at 10 to conserve material, reduce weight, and provide a neat, streamline appearance.

These cross-members 7 are precision made, openings 11 being punched therein in spaced relation and are of a shape and size to snugly accommodate the sill members 5 and 6, the upper marginal edge of the openings 11 being so disposed that the flange 8 of the cross member lies flat thereon and in facial contact therewith, all as clearly shown in Fig. 4 of the drawing.

Some of the cross members 7 will be of varying length, but they are formed in an identically similar manner, with the exception of the front cross member 7a (see Fig. 3 of the drawing) which has additional openings 12 therein to accommodate the angularly disposed bars 14 of the draw bar assembly, the inner ends of the bars 14 being welded to the sill members 5 and 6 at the point 15, the outer ends converging, and a ball hitch (not shown) is secured thereto in any desired manner.

Wheels W indicated in broken lines in Fig. 1, support the frame as usual, and this running gear can be of any desired design. The assembly of the frame is comparatively simple and easy, the longitudinal sill beams 5 and 6 being first placed in spaced relation, after which the various cross bars are threaded on said sill beams and welded in position to form a unitary rigid frame, the upper flange 8 of the cross bar resting in facial contact with the upper face of the sill members.

The above described arrangement permits a large number of frames to be purchased in knockdown form for assembly as needed; the storage space required is small, and the customer has the advantage of quantity purchase of standard precision frames.

From the foregoing description, it will be obvious that I have perfected a very simple, practical, precision-manufactured, knockdown vehicle frame which requires a minimum of storage space and is extremely rigid when assembled.

What I claim is:

1. In a vehicle frame construction, comprising spaced-apart I-beam shaped main sill members, a plurality of substantially U-shaped cross bars mounted thereon in spaced relation and of greater depth than the sill members and formed with spaced openings of a size and shape to accommodate said sill members, a relatively wide turned flange on the upper edge of each cross member for rigid connection to the upper face of the sill members to form a unitary frame structure with the lower turned flange of the cross member being of less width than the upper edge and spaced below said sill member.

2. A packaged vehicle frame comprising, a pair of spaced-apart one-piece sill members, I-beam shaped in cross section, a plurality of cross members substantially channel-shaped in cross section mounted thereon with the upper flange of the cross member disposed in facial contact with the sill members and welded thereto and the lower flange disposed below and spaced from the lower face of the sill members, said cross members being of uniform length with shorter cross members disposed between the vehicle wheels.

3. A vehicle frame construction comprising, a pair of spaced-apart main sill members, a plurality of U-shaped cross members mounted thereon, said cross members having precision punched openings therein shaped to accommodate the sill members, a relatively wide flange on the upper edge of each cross member for rigid connection to said sill members with the lower turned flange of said cross member extending below the sill and spaced therefrom.

References Cited in the file of this patent

UNITED STATES PATENTS

| 2,055,594 | Steinecke | Sept. 29, 1936 |
| 2,494,115 | Bock | Jan. 10, 1950 |

FOREIGN PATENTS

| 595,854 | Germany | Apr. 28, 1934 |
| 313,324 | Italy | Dec. 22, 1933 |